Figure 3:
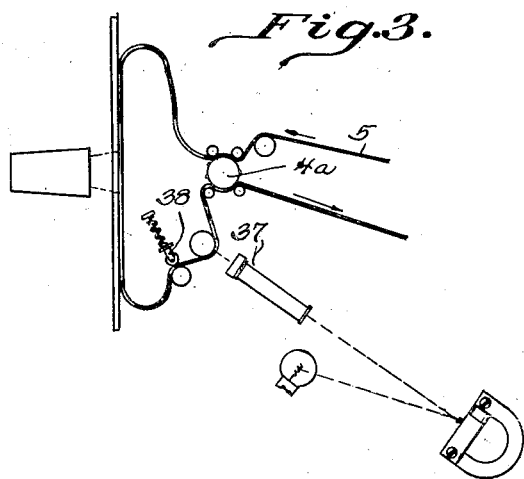

Sept. 5, 1933.  T. LINDENBERG, JR  1,925,451
METHOD AND APPARATUS FOR RECORDING AND
REPRODUCING SOUND ON PHOTOGRAPHIC FILM
Filed July 15, 1931   2 Sheets-Sheet 1
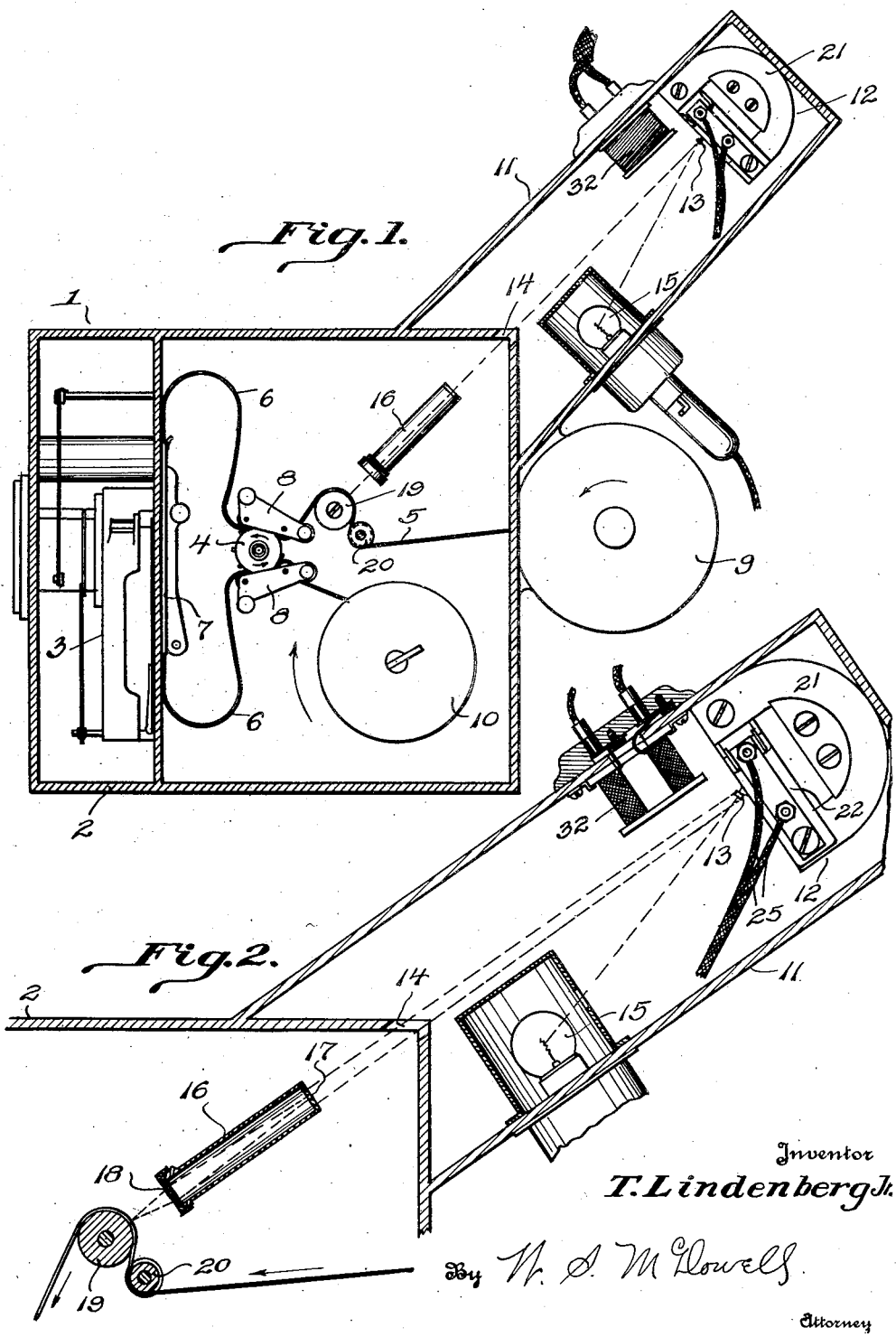
Inventor
T. Lindenberg Jr.
By W. S. McDowell
Attorney Sept. 5, 1933.    T. LINDENBERG, JR    1,925,451
METHOD AND APPARATUS FOR RECORDING AND
REPRODUCING SOUND ON PHOTOGRAPHIC FILM
          Filed July 15, 1931    2 Sheets-Sheet 2

Inventor
T. Lindenberg Jr.

By W. A. McDowell
Attorney

Patented Sept. 5, 1933

1,925,451

UNITED STATES PATENT OFFICE 1,925,451

METHOD AND APPARATUS FOR RECORD-
ING AND REPRODUCING SOUND ON
PHOTOGRAPHIC FILM

Theodore Lindenberg, Jr., Columbus, Ohio

Application July 15, 1931. Serial No. 550,893

1 Claim. (Cl. 88—16.2)

This invention relates to a method and apparatus for recording and reproducing sound on photographic film and is directed more particularly to apparatus used in connection with the producing of motion picture films wherein the sound is recorded on the film simultaneously with the recording of pictorial images thereon.

More specifically, the invention is concerned with that method of sound recording known as "variable area" method, wherein a light beam, reflected from an electrically controlled vibratory mirror, is passed through a restricted slot or passage and on to the film, producing a light track of varying length depending upon the extent of mirror vibrations as the film is passed by the recording mechanism. Apparatus involving this, as well as other methods, have heretofore been limited largely to use in professional fields, due to the complicated and delicate nature of the apparatus, requiring expensive installations and skilled operators to produce successful results.

An object of the present invention is to simplify apparatus of this character so that it may be suitable for use by relatively unskilled operators and to make it particularly adaptable to small hand-carried types of cameras, which may be readily transported from one place to another and set up for operation without undue preparation or equipment.

Another object of the invention resides in the provision of motion picture producing and projecting apparatus wherein sound recording and reproducing mechanisms are arranged in advance of the photographic and projecting lenses of such apparatus, whereby the film is operated to cause its registration with said mechanism in its movement through said apparatus prior to its registration with the photographing and image-projecting lenses.

In commercial apparatus now commonly employed, the camera and projecting units are constructed so that the sound mechanism is disposed to register with the film subsequent to the passage of the film past the aforesaid lenses. This ordinary construction entails the employment of additional gearing, remotely situated with respect to and largely independent of the gearing used in moving the film past the lenses, with the result that the size and bulk of the apparatus is unnecessarily enlarged and difficulty is obtained in synchronizing the recorded sound on the film with the pictorial action images impressed thereon, due to the relatively great distance between the lenses and the sound mechanism.

With these and other objects in view, which will appear as the description proceeds, the invention consists in the novel features of construction, combinations of elements and arrangements of parts hereinafter to be more fully described and pointed out in the appended claim.

In the accompanying drawings:

Figure 1 is a vertical sectional view showing somewhat diagrammatically the interior of a motion picture camera having the sound recording mechanism of the present invention incorporated therein, Figure 2 is an enlarged vertical sectional view taken through the sound recording mechanism, Figure 3 is a view showing a slightly modified form of the invention.

Referring more particularly to the drawings, the numeral 1 designates the apparatus in its entirety which, for purposes of illustration, has been shown as that of a small portable camera of the type used by amateur photographers in making motion pictures, although it will be understood that the invention is equally adaptable to the type of cameras used by professionals or others in the motion picture industry.

This apparatus includes a camera unit 1, which is of any suitable standard construction, and comprises the usual light-tight casing 2 having arranged in the forward portion thereof the lens and shutter mechanism 3 by which the film is exposed and caused to travel in an intermittent manner past the lens, as is well known in the art. Also positioned within the casing 2 is the usual driving sprocket 4 over which the film, designated by the numeral 5, is trained in the usual manner to provide the upper and lower loops 6 and for passage within the guide 7 arranged to the rear of the shutter mechanism 3. By the arrangement of the film 5 relative to the sprocket 4, the loops 6 of the film are constantly maintained and which permit of intermittent motion of the film through the guides 7 while being passed at a constant speed over and adjacent the sprocket 4. The film is further trained over rollers carried in frames 8 and its ends led to the reels or magazines 9 and 10, of which numeral 9 designates the magazine or reel carrying the unexposed part of the film and numeral 10 the exposed or what is known as the "take up" magazine or reel. The latter reel is operated in connection with the sprocket to wind the film after the same has been photographically exposed by the operation of the shutter mechanism 3.

So far the mechanism described is that of the usual construction found in cameras of this type, the sprocket 4 and the related mechanism being operated by a crank or other means (not shown) causing the film to unwind from the reel 9, passed at a constant speed over the sprocket and guiding rolls, intermittently moved by the shutter mechanism and finally wound upon the reel member 10.

The sound-recording mechanism comprises in this instance a housing 11 attached in any suitable manner to the casing 2 and has positioned therein a magnetic vibrator, designated generally by the numeral 12. The vibrator unit 12 carrying the mirror, consists of a permanent magnet 21, between the ends of which is bridged an electromagnet 22, which is connected by leads 25 to the outlet side of an amplifying unit (not shown). A monitor or induction unit 32 is positioned in the magnetic field of the vibrator 12, whereby the induction thereof is employed to operate an induction circuit to permit the operator to control the amplitude of the sound current, as described and claimed in my divisional application, bearing Ser. No. 622,214, filed July 13, 1932. This vibrator is formed to include a small mirror or light reflector 13 arranged in registration with an opening 14, formed in the wall between the casing and the housing 11. Arranged within the housing 11 is a light source usually in the form of an incandescent bulb 15 which is adapted to throw a beam of light upon the mirror or reflector which, in turn, reflects the beam in a line through the opening 14 and into the casing 2.

Within the casing there is positioned a stationary tubular member 16 having its longitudinal axis in alignment or registration with the opening 14 and provided with a very restricted aperture or slit 17 in its upper end wall and having a condensing lens 18 positioned in its lower portion. The light reflected from the mirror 13 passes through this slit and the condensing lens 18 and produces a narrow concentrated image of the slit on the film. The film at this point is trained around guide rollers 19 and 20, the former of which is arranged so that the beam of light strikes the film squarely or at right angles to the longitudinal axis of said roll, the film being trained over the roller 19 and under the roller 20 thereby causing the film to be guided in an even and taut manner over said rollers, preventing slippage or slack.

An important feature of this apparatus is the location of the rollers 19 and 20 over which rollers the film is passed by the pull imparted by the sprocket 4. Due to the particular location of said rollers, which is at a point between the unexposed film magazine and the main sprocket element, the use of extra sprockets or gearing mechanism heretofore employed is eliminated. The employment of such extra mechanism is used when the sound is recorded on the film after its picture exposure. The elimination of such sprockets and gear mechanisms simplifies the apparatus considerably, lightens its weight, and increases its portability to a considerable extent.

In the modified form, disclosed in Figure 3, the sound recording mechanism instead of being arranged ahead of the picture recording of the film is produced after such picture recording. However, in this as well as in the preferred form, the sound recording mechanism 37 is so disposed relative to the main sprocket 4a as to derive power therefrom for the moving of the film. Although this location is not as desirable as the one in the preferred form, practical results may be obtained by the employment of film guides 38 which will exert a desired friction upon the film to hold the same in a taut manner while passing the sound recording mechanism and to eliminate such vibrations set up in the film as will be produced by the reciprocatory mechanism for effecting the intermittent action of the film past the shutter mechanism of the camera.

The apparatus may be crank operated or provided with a suitably geared motor for the feeding of the film, obtaining its source of power from batteries carried in connection with the apparatus. The batteries may also supply the current for the light source 15 and the lamp may be of the ordinary type found and used in connection with the lighting system of motor vehicles or small renewable dry cells of the type used for flash lamps.

While the apparatus has been particularly designed to develop sound recording on sixteen millimeter film, yet it may be adapted to larger film with equal facility. Although there has been shown and described a certain particular arrangement of the various parts of the apparatus, nevertheless it will be understood that changes may be made therein from time to time without departing from the spirit and scope of the present invention as set forth in the appended claim.

What is claimed is:

In combination with a motion picture camera, a picture recording mechanism contained wholly within a main casing, a main sprocket over which a film passes, a film magazine, a roller disposed adjacent said sprocket over which roller the film passes, a tubular member disposed adjacent the roller, a lens in said tubular member adjacent said roller and a slit at the opposite end of said tubular member, an auxiliary casing mounted upon and communicating with said main casing and aligned with said tubular member, and means in said auxiliary casing for directing sound actuated light waves upon said slit.

THEODORE LINDENBERG, Jr.